(12) United States Patent  
Lieven

(10) Patent No.: US 8,240,608 B2
(45) Date of Patent: Aug. 14, 2012

(54) DEVICE FOR INSTALLING WINDSHIELD PANES

(75) Inventor: Patrick Lieven, Fronton (FR)

(73) Assignee: Airbus Operations SAS, Toulouse (FR)

( * ) Notice: Subject to any disclaimer, the term of this patent is extended or adjusted under 35 U.S.C. 154(b) by 304 days.

(21) Appl. No.: 12/707,202

(22) Filed: Feb. 17, 2010

(65) Prior Publication Data

US 2010/0224729 A1    Sep. 9, 2010

(30) Foreign Application Priority Data

Feb. 18, 2009  (FR) ..................................... 09 51040

(51) Int. Cl.
*B64C 1/14* (2006.01)
(52) U.S. Cl. ................ 244/129.3; 244/129.4; 244/129.5
(58) Field of Classification Search ............... 244/129.3, 244/129.4, 129.5
See application file for complete search history.

(56) References Cited

U.S. PATENT DOCUMENTS

| 2,132,688 | A |   | 10/1938 | Helwig |  |
|---|---|---|---|---|---|
| 3,444,662 | A | * | 5/1969 | Partain | 52/786.12 |
| 4,004,388 | A |   | 1/1977 | Stefanik |  |
| 4,258,889 | A | * | 3/1981 | Hunt | 244/207 |
| 4,588,147 | A | * | 5/1986 | Lindsey, Jr. | 244/118.1 |
| 7,942,369 | B2 | * | 5/2011 | Mahieu et al. | 244/129.3 |
| 2003/0062450 | A1 | * | 4/2003 | Dazet et al. | 244/129.3 |
| 2009/0084900 | A1 |   | 4/2009 | Krahn |  |

FOREIGN PATENT DOCUMENTS

| DE | 102005058749 A1 | 2/2007 |
|---|---|---|
| EP | 1481892 A | 12/2004 |

OTHER PUBLICATIONS

French Search Report and Written Opinion dated Oct. 13, 2009.

* cited by examiner

*Primary Examiner* — Christopher P Ellis
*Assistant Examiner* — Medhat Badawi
(74) *Attorney, Agent, or Firm* — Perman & Green, LLP

(57) ABSTRACT

A fastening device for at least one pair of window panes, especially aircraft windshield window panes, each having a window pane retainer equipped with a frame that is applied to the borders of receptacle openings for the window panes, wherein the frames have a pair of posts facing one another provided with matching profiles that can mate the aforementioned posts, one inside the other, in a fastening line of the window pane retainer on the common border to the openings that receive the pair of panes.

9 Claims, 2 Drawing Sheets

DEVICE FOR INSTALLING WINDSHIELD PANES

CROSS-REFERENCE TO RELATED APPLICATIONS

This application claims priority to and the benefit of French Application No. 09 51040 filed on 18 Feb. 2009, the disclosures of which are incorporated by reference in its entirety.

The aspects of the disclosed embodiments relate to a device for installing windshield panes, and especially aircraft windshield panes.

BACKGROUND

Windshield panes for the cockpit of an aircraft are installed from the inside or from the outside.

If the panes are installed from the outside, the glass is pressed against a frame composed of or attached on the uprights and crossbeams of the fuselage at the cockpit or on its skeleton.

The panes are placed in contact with the frame by means of exterior window pane retainers, which in turn are fastened to the crossbeams and uprights of the fuselage by means of screws or rivets.

This type of installation with window pane retainers leads to a reduction of the useful area of the pane, and to a thickening of the posts between two panes, which reduces the field of vision of the pilots, especially because the fastening of the retainers of two adjacent panes is done on two adjacent lines on the uprights of the cockpit.

SUMMARY

The purpose of the disclosed embodiments is to reduce the bulk of the windshield pane fasteners, in particular of aircraft cockpit windshield panes, and consequently to reduce the width of the posts between these panes.

In this context, the disclosed embodiments propose a fastening device for at least a pair of window panes, especially aircraft windshield window panes, each of which has a window pane retainer equipped with a frame that is applied to the edges of the window pane receptacle openings, for which the frames have a pair of posts facing one another provided with matching profiles suitable for mating said posts, one inside the other, in a fastening line of the window pane retainers on the common border of the openings of that receive the pair of window panes.

The disclosed embodiments also relate to an aircraft windshield comprising the fastening device of the disclosed embodiments and an aircraft provided with such a windshield, with the disclosed embodiments allowing a reduction of the aerodynamic turbulence and noise due to the assembly of the window pane retainers on the aircraft cockpit.

BRIEF DESCRIPTION OF THE DRAWINGS

Other characteristics and benefits of the disclosed embodiments will be found from the description of a non-limiting example of embodiment that follows, accompanied by drawings that show.

DETAILED DESCRIPTION

Figure 1:
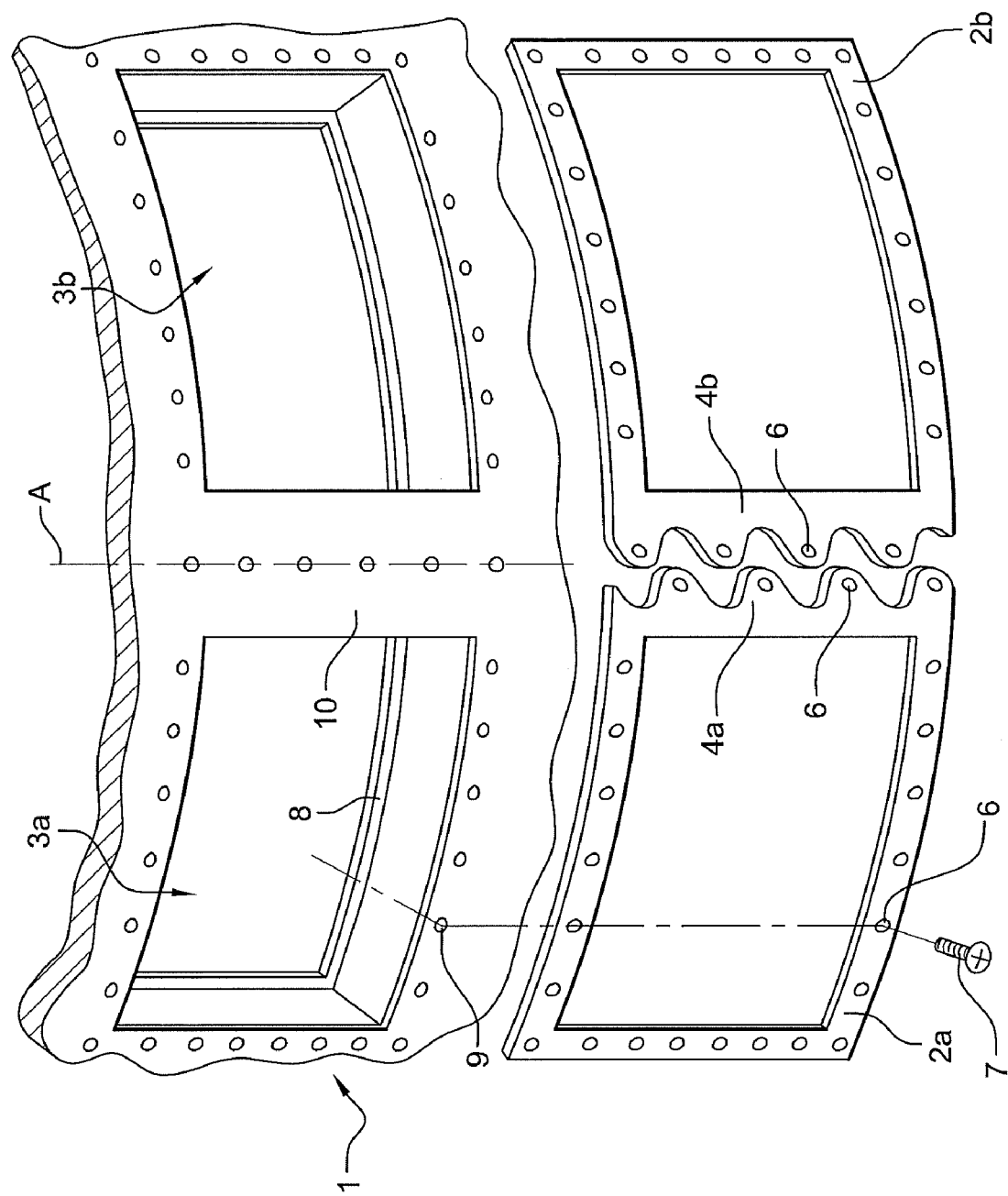
FIG. 1: a perspective representation of an external section of an aircraft cockpit and of fastening frames for window panes equipped with a device pursuant to the disclosed embodiments.

FIG. 1 shows an external section of an aircraft cockpit provided with openings 3a, 3b that form receptacles to receive windshield window panes.

The panes are held in the receptacles by means of window pane retainers 2a, 2b that are applied to the border of the receptacles by fasteners 7 such as screws passing through the window pane retainers and tightened in the tapped holes 9 encircling the openings 3a, 3b.

The fastening device of the disclosed embodiments permits fastening a pair of window panes, each having a window pane retainer 2a, 2b equipped with a frame applied to the borders of the openings 3a, 3b for receiving the panes in a way that reduces the width of the post between the panes.

Between the two openings 3a, 3b pursuant to the disclosed embodiments, the aircraft fuselage has an upright 10 that has a single fastening line A provided with vertically aligned holes for fastening the pair of window pane retainers 2a, 2b, while in the prior art two parallel fastening lines permit fastening the frames of the window pane retainers beside one another.

Always according to FIG. 1, the frames of the pair of window panes have a pair of facing posts 4a, 4b provided with matching profiles 5a, 5b suitable for mating said posts, one inside the other, on the fastening line A for the window pane retainer on the common border of the openings that receive the pair of window panes.

The matching profiles of each of said posts have complementary hollows and solids, with the solids having means 6 for receiving fasteners 7 of the window pane retainers on the common border of the openings receiving the pair of window panes.

In this way, the posts 4a, 4b mate with one another to form a single post of reduced width.

Figure 2:
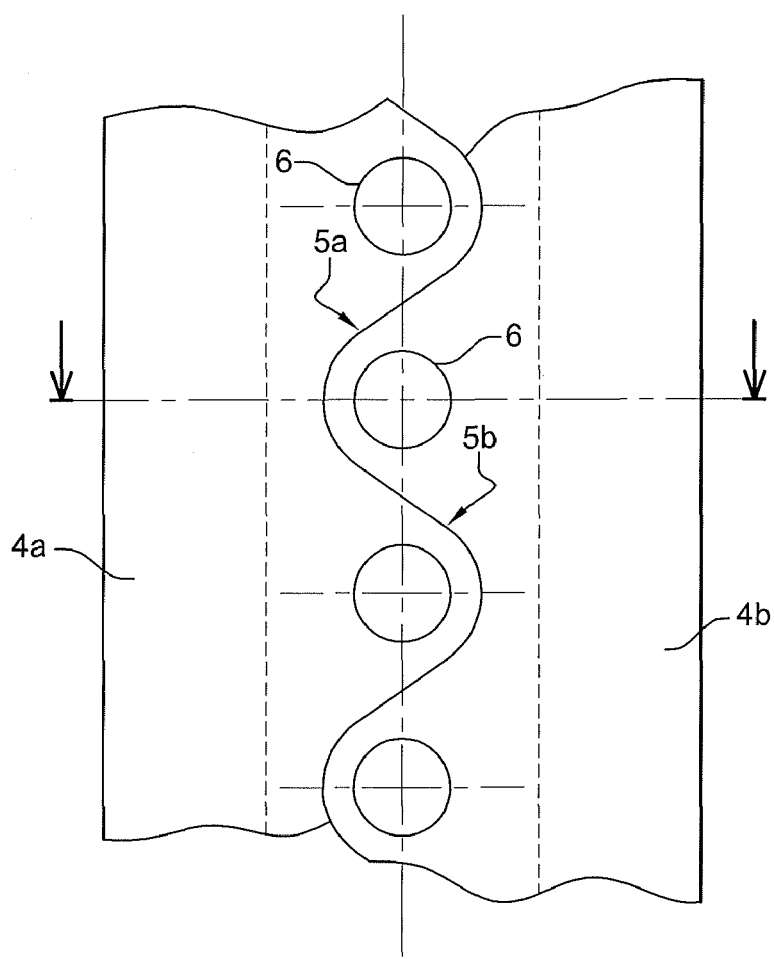
FIG. 2: a detail of an embodiment of a device pursuant to the disclosed embodiments.

FIG. 2 shows a detail of the posts 4a, 4b facing one another according to an embodiment in which the matching profile is made in the form of a wavy matching profile around the fastening line produced by the alignment of the holes 6. In a variant, the matching profile 5a, 5b can be indented.

The solids and the hollows defined by the matching profiles of the posts of the pair of posts being alternated, the fasteners located on the fastening line are received alternately on said posts 4a, 4b facing one another.

To maintain a number of points fastened by the retainer compatible with the strength of the fastening of the panes, the spacing between the fastening points can be reduced relative to a standard installation device for which each retainer has its own fastening line.

Figure 3:
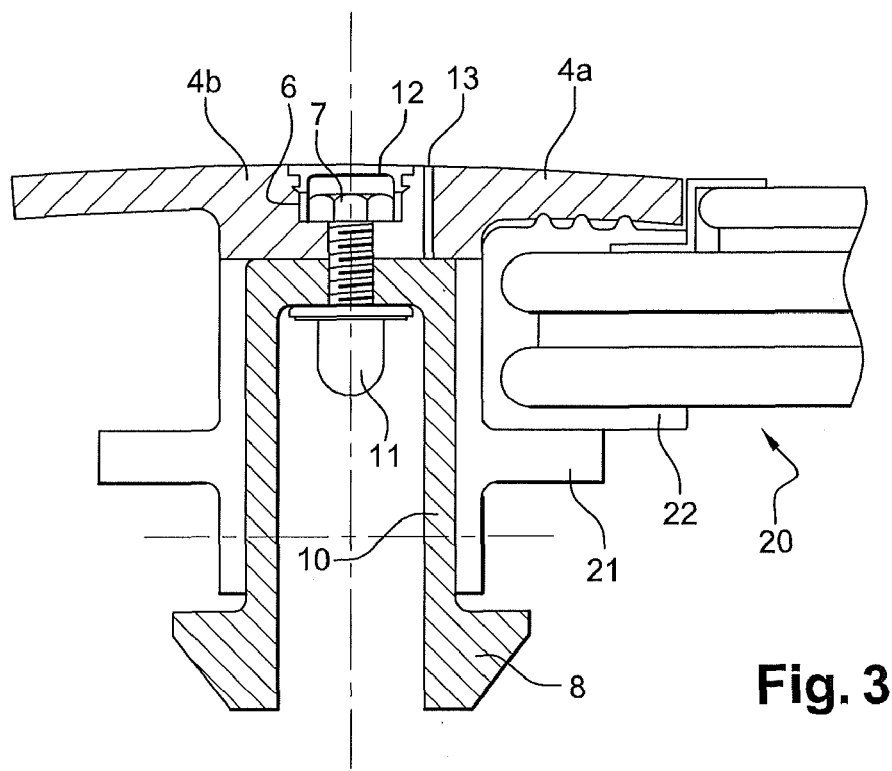
FIG. 3: a detail cross section of an installation of a windshield window pane on an upright according to the disclosed embodiments.

An example of a fastener 7 passing through is given in FIG. 3, which shows a detail in cross section of a windshield window pane installation on an upright pursuant to the disclosed embodiments.

According to this example, the fasteners 7 are traversing fasteners such as screws or rivets.

According to the example, the fastener shown is a screw 7, with the screw and a nut 11 clamping the post 4b of the frame to the upright 10 of the fuselage.

The receptacles 6 in this case are holes for receiving said means passing through, with the upright of the fuselage itself being provided with smooth holes through which passes the shank of the screw 7.

According to this FIG. 3, the window pane 20 is a multiple-ply window pane held between a shoulder 21 and the frame comprising the post 4a.

The tightness of the windshield is obtained by using a peripheral joint 22 of known type around the window pane 20, with this joint being compressed during the tightening of the fastening points of the window pane retainer.

The upright of the fuselage includes a flange 8 that permits the dimensional stability of the upright to be adjusted to counter its deformation during the pressurization of the apparatus.

On the outside, the holes consisting of the receptacles 6 in the matching posts according to the example are stepped holes comprising a widened upper part receiving the head of the screw to tighten the mated posts on the fuselage upright using nuts 11.

To reduce the aerodynamic turbulence at the windshield fastening, the holes 6 are closed with plugs 12.

In the same way, the interstices 13 between the matching profiles of the posts facing one another can be filled up with a sealing material, which also has the benefit of reducing aerodynamic perturbations and associated noises caused by the installation of the window pane retainers on the cockpit.

When the device of the disclosed embodiments equips an aircraft windshield, an additional benefit is that the fastening area of the window pane retainers on the central upright has a shape that generates less aerodynamic noise than the prior installations because the joint area between the retainers is reduced and the interstices between the posts 4a, 4b of the retainers themselves have a reduced width.

The disclosed embodiments allow a reduction of the dead corner zones for the pilots at the windshield window pane posts, while preserving the proper rigidity and tightness of the windshield.

It is not limited to the example shown, and in particular is applicable to flat or double-curvature windshields.

It also applies to a succession of more than two window panes by equipping multiple posts of successive window pane retainers of the fastening device of the disclosed embodiments.

The invention claimed is:

1. At least one pair of window pane retainers comprising: frames applied to borders of receptacle openings for window panes, the frames comprising a pair of posts facing one another provided with matching edge profiles that mate one inside the other by alternately extending over a fastening line of the window pane retainers on a common border of the receptacle openings.

2. The at least one pair of window pane retainers according to claim 1 wherein said posts facing one another have profiles that alternate around the fastening line.

3. The at least one pair of window pane retainers according to claim 1 for which the matching edge profile of each of said posts has complementary hollows and solids equipped with means for receiving fasteners of the window pane retainers on the common border to the openings that receive the pair of window panes.

4. The at least one pair of window pane retainers according to claim 3, wherein the fasteners are means that pass through, and that the means for receiving are receiving holes for said means that pass through.

5. The at least one pair of window pane retainers according to claim 4, wherein the receivinq holes are stepped holes, each comprising a widened upper part for receiving a head of the fastener, and for receiving a plug that closes the hole.

6. The at least one pair of window pane retainers according to claim 3 wherein the solids on the posts of the pair of posts are alternated, and the fasteners located on the fastening line are received alternately on said posts facing one another.

7. Aircraft windshield comprising at least one pair of window pane retainer according to claim 1.

8. Aircraft windshield according to claim 7, wherein interstices between the matching edge profiles are filled with a sealant material.

9. Aircraft comprising a windshield according to claim 7.

* * * * *

UNITED STATES PATENT AND TRADEMARK OFFICE
CERTIFICATE OF CORRECTION

PATENT NO.         : 8,240,608 B2
APPLICATION NO.    : 12/707202
DATED              : August 14, 2012
INVENTOR(S)        : Patrick Lieven It is certified that error appears in the above-identified patent and that said Letters Patent is hereby corrected as shown below:

Column 4, line 23, Claim 5, delete "receivinq" and insert -- receiving --, therefor.

Column 4, line 31, Claim 7, delete "retainer" and insert -- retainers --, therefor.

Signed and Sealed this
Twenty-third Day of October, 2012

David J. Kappos
*Director of the United States Patent and Trademark Office*